United States Patent [19]
Myran

[11] Patent Number: 5,921,565
[45] Date of Patent: Jul. 13, 1999

[54] SULKY

[76] Inventor: Odd Myran, Rudsdalen 80, N-1351 Rud, Norway

[21] Appl. No.: 08/501,009

[22] PCT Filed: Feb. 9, 1994

[86] PCT No.: PCT/NO94/00032

§ 371 Date: Nov. 14, 1995

§ 102(e) Date: Nov. 14, 1995

[87] PCT Pub. No.: WO94/18050

PCT Pub. Date: Aug. 18, 1994

[30] Foreign Application Priority Data

Feb. 11, 1993 [NO] Norway .................................. 930488

[51] Int. Cl.[6] ....................................................... B62C 1/08
[52] U.S. Cl. ................................................. 280/63; 280/65
[58] Field of Search ........................... 280/47.131, 47.15, 280/63–77

[56] References Cited

U.S. PATENT DOCUMENTS

| | | | |
|---|---|---|---|
| 344,017 | 6/1886 | Teller | 280/70 |
| 426,369 | 4/1890 | Doolittle | 280/77 |
| 467,204 | 1/1892 | Schwalen et al. | 280/70 |
| 3,482,851 | 12/1969 | Rickard | 280/63 |
| 3,503,624 | 3/1970 | Weber et al. | 280/64 |
| 4,135,730 | 1/1979 | Yunick | 280/65 |
| 4,313,661 | 2/1982 | Heinze, Jr. et al. | 280/63 |
| 4,679,807 | 7/1987 | Reybon | 280/65 |
| 4,863,180 | 9/1989 | Guarino et al. | 280/63 |
| 5,062,652 | 11/1991 | Burke | 280/64 |

FOREIGN PATENT DOCUMENTS

| | | | |
|---|---|---|---|
| 1255504 | 11/1967 | Germany . | |
| 420185 | 9/1981 | Sweden . | |
| 449202 | 4/1987 | Sweden . | |
| WO 93/19970 | 10/1993 | WIPO | 280/63 |

*Primary Examiner*—Brian L. Johnson
*Assistant Examiner*—Min Yu
*Attorney, Agent, or Firm*—Lawrence S. Cohen

[57] ABSTRACT

A sulky comprises two wheels (7) which are attached via frame members (3) to the sulky's support structure, which consists of a beam section (1) which connects the wheels (7), a seat section (2) and shafts (4). In order to give the horse which is harnessed between the shafts (4) an impulse by means of swinging movements from the driver who is sitting on the seat (2), the shafts (4) are designed with an arm member (6) which is facing the wheel (7). This arm member (6) is rotatably connected to the frame member (3). From the shaft (4) to the beam section (1) there is maintained a connection (9) for transfer of tensile force.

9 Claims, 1 Drawing Sheet

SULKY

FIELD OF THE INVENTION

The invention relates to sulkies.

BACKGROUND OF THE INVENTION

Sulkies are very light carriages which are used in trotting races, where the driver sits on a very light-weight two-wheeled carriage. The driver therefore sits with his centre of gravity over and slightly behind the wheel mounting, with the result that when he swings or stretches his legs, this causes a kind of up and down rocking movement, thus influencing the horse. Impulses of this kind are intended to give the horse added inspiration, thus contributing to the attainment of maximum speed.

From DE-A-3 313 694 (corresponding to SE-B-449 202) it is known a sulky construction with shafts which are provided with arm members extending downwardly from each shaft. The shaft itself extends to the beam section of the sulky, so that the main function of the arm members extending downwardly in direction to the wheels is to be supporting elements. After having made all adjustments necessary for using the sulky the arm members will maily act as a stiff connection. In the known embodiment it is in the lower part no pivotal connection to the rear part of the shaft. By the construction according to the German publication it is an object with simple means being able to displace the wheels in the length direction of the sulky. The sulky has therefore been provided with a wheel mounting which makes it possible to displace the position of the wheels in the length direction of the sulky in order to control and change the vertical load on the wheels according to the hardness of the road, without having to change wheels. In order to reduce the rolling, friction on the soft tracks the wheels should be positioned more backwardly in relation to the driving direction. Such a change of the positioning of the wheels will have influence on the forces exerted on the horse in the direction vertical to the direction of movement, it is, however, not achieved any forces on the horse in the moving direction, i.e. no horisontal forces are established.

Even though a swinging movement of this kind will influence the horse, it will only exert an up and down momentum on the horse and due to the rigid design of the sulky this will also cause relatively hard jolting movements.

SUMMARY OF THE INVENTION

The invention concerns an improvement for a sulky having two shafts and a frame member comprising two lateral arms linked by a central horizontal beam section, said beam section supporting a seat section and having a mechanical connection to said shafts each of said lateral arms supporting towards its distal end a wheel by means of a wheel mounting, whereby a rear arm member extends downwardly from each shaft at an angel thereto, faces the respective wheel and is pivotally attached at its other end to a fulcrum point on the receptive lateral arm at a distance from the wheel mounting.

An object of the present invention is to provide a sulky which permits a more favourable influence to be exerted on the horse via the shaft, based on the movements of the driver on his seat. Thus it is an object of the invention to provide a device which enables the horse to be not only influenced by forces in the upward and downward direction, i.e. vertically directed forces, but also by a force which acts in the forward direction in the horse's direction of travel, i.e. a horisontal force component.

A further object of the invention is to provide an improvement which makes this movement as comfortable as possible, thus achieving a kind of shock absorption, while at the same time the influence on the horse is maintained. Thus it is also desirable to provide a sulky which permits at least a reduction in the shaking when driving on an uneven course.

These objects are achieved with a sulky of the type mentioned in the introduction, which is characterized in that the rear arm member forms a rigid continuation of the respective shaft, the fulcrum point is preferably lower than the wheel mounting, and the mechanical connection between said beam section and said shafts is an elastic connection for transmitting only tensile force from the shafts to the beam section.

Further advantageous features of the invention are indicated in the sub-claim.

DETAILED DESCRIPTION

Figure 1:
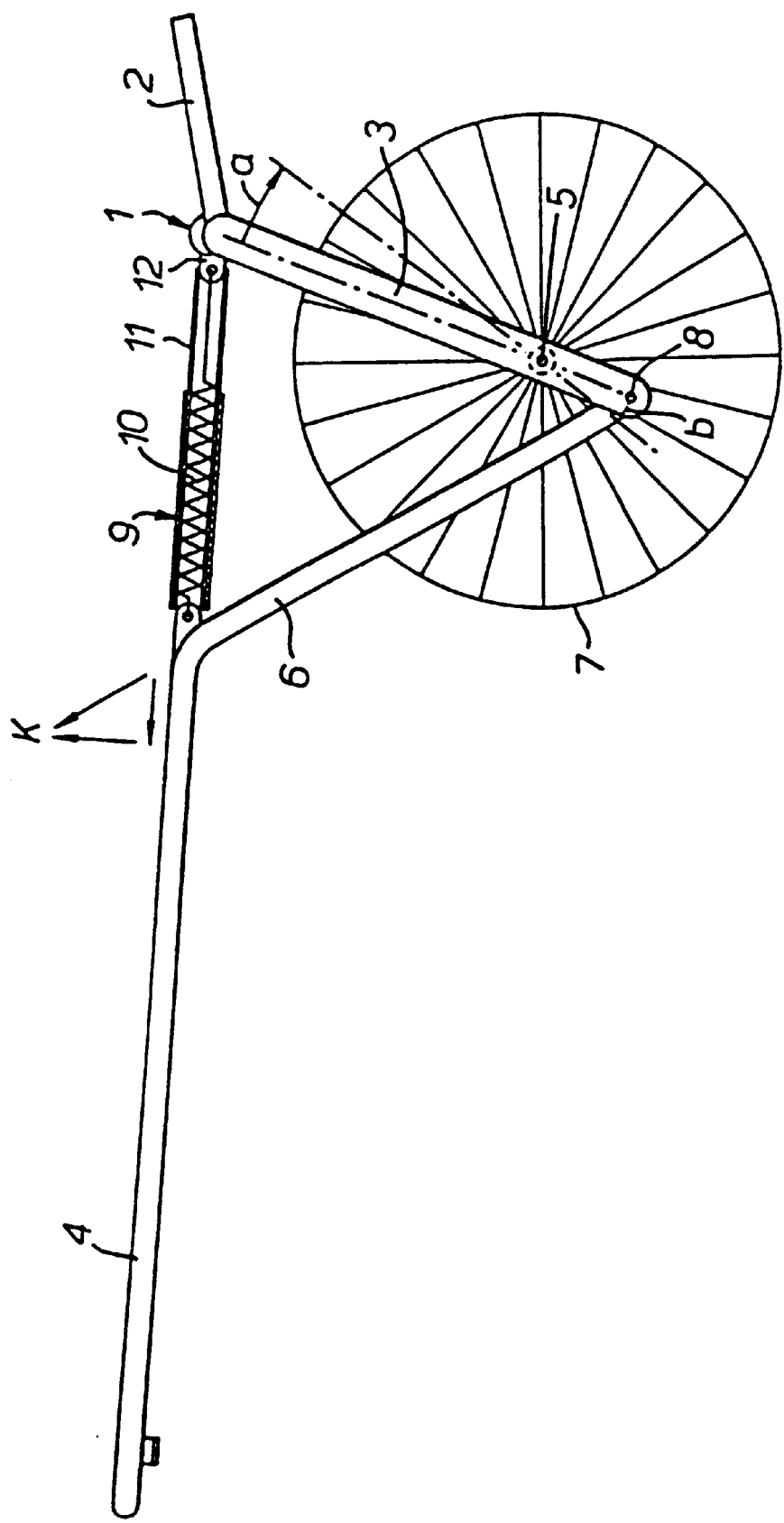
FIG. 1 is a side view of a sulky showing the invention.

When it is specified that the shaft is designed with an arm, this means that the shaft is bent with an arm member at an angle to the main longitudinal direction. This arm normally forms a part of the actual shaft, even though it will, of course, be possible to find other design forms.

By having the shafts led down to the wheel area and rotatably connected there with the sulky's frame member, while at the same time creating a connection for transfer of tensile force instead of a rigid connection from the shaft to the beam section, the object has been achieved that the transfer of force when the driver swings on his seat will provide a stronger force component in the shaft's longitudinal direction, thus influencing the horse in its direction of travel. This influence will be particularly marked if the joining point between the arm of the shaft and the frame member is located at a distance under the wheel mounting, i.e. as far from the driver's seat as practically possible. The connection between the shaft and the upper part of the frame member where the driver's seat is located, i.e. the straight extension of the shaft is designed as a connection for transfer of tensile force which can be composed of an elastically springing or dampening element, e.g. a spring placed in a telescopic cylinder. Other dampening or springing elements can, of course, also be used here and in principle it would be sufficient to use a thick, elastic rubber band.

This elastically springing connection will provide springing for the whole carriage and will result in a marked cushioning of the shaking experienced on an uneven course, while at the same time dampening down the hard effects of jolting on the horse. Due to the force which is exerted in the shaft's longitudinal direction, the length of the horse's step will automatically be increased by a few millimeters, which will result in greater speed.

The invention will now be described in more detail by means of an embodiment which is depicted in the drawing, which illustrates in a purely schematic side view the principle of the design of the invention.

A sulky is constructed in the traditional manner of a support structure in the form of a beam section which connects the sulky's two wheels and which also on a conventional sulky is connected to the shafts 4. On the beam section 1 the seat section 2 is also located as is indicated schematically in the figure and in this area there is also attached the frame member 3 which forms the mounting and the connection to the wheel suspension. The frame member 3 can, e.g., be as designed at each wheel as a fork which constitutes the mounting for the wheel axis 5.

According to the invention the shaft 4 is designed with an arm member 6 which is angled down towards the frame member 5, on one side of the wheel 7 and is attached by a pivot joint, e.g. a swivel pin 8 to the frame member 3. In the illustrated embodiment, the fulcrum 8 is located in the extension of the frame member 3 beyond the wheel axis 5, i.e. at the end of the frame member 3 which faces away from the seat 2.

In the straight extension of the shaft's 4 main direction, and attached to the top of the frame member 3 or the beam section 1 there is located a connection for transfer of tensile force which is generally indicated by 9. This connection is preferably designed as an elastically springing or dampening device, e.g. a spring element 10 which is located in a telescopic casing 11, which is connected with a rotatable coupling 12 to, e.g. the beam section 1.

If the driver rocks in his seat, e.g. by stretching his legs, the seat and the frame member are tilted as indicated by an arrow at the seat 2. The frame member 3 will thereby be moved downwards about the wheel axis 5, as is exaggeratedly indicated as an arc a. By means of the illustrated location of the connection point 8 on the arm member 6, the connection point will be moved forward in an arc b, thereby moving the shaft 4 a distance forward corresponding approximately to the arc b. The forces thereby created are illustrated in a triangular arrow diagram K and shows that a force component will be created there in the longitudinal direction of the shaft. This force component will give the horse an impulse forward and the length of the horse's step will thus increase by a few millimeters, thus achieving greater speed.

With the illustrated spring design which creates a connection transferring tensile force between the sulky's beam section/seat and shaft, there is provided an independent springing which will cushion the shaking experienced on an uneven course, while at the same time absorbing shocks in the connection between the seat and the shaft. In a practical design, the fulcrum 8 is placed approximately 120 mm below the wheel mounting 5. Without swinging the spring device will pull the shaft and the wheel fork, i.e. the frame member together.

Many modifications will be possible within the scope of the invention. Thus many different springing and dampening devices can be used instead of the illustrated spring, hydraulic devices can be used and a simple "rubber band" can be employed. The location of the fulcrum 8 in relation to the wheel axis 5 can also be varied depending on the desired effect which is to be achieved. In principle the fulcrum 8 can also coincide with the axis 5 or be located above it, but this will lead to a reversed pattern of movement, with the result that the impulse forwards will occur when the driver rises and not when he pushes down.

I claim:

1. A sulky having two shafts (4) and a frame member (3) comprising two lateral arms linked by a central horizontal beam section (1), said beam section supporting a seat section (2) and having a mechanical connection (9) to said shafts (4), each of said lateral arms (3) depend downwardly and supporting a wheel (7) mounted on a lower portion of said lateral arms by means of a wheel mounting (5), whereby a rear arm member (6) extends downwardly from each shaft (4) at an angle thereto, faces the respective wheel (7) and is pivotally attached proximate a lower end thereof at a fulcrum point (8) on the respective lateral arm (3) at a distance from the wheel mounting (5), characterized in that the rear arm member (6) forms a rigid continuation of the respective shaft (4); the fulcrum point is lower than the wheel mounting (5); and the mechanical connection (9) between said beam section (1) and said shafts (4) is an elastic connection for transmitting only tensile force from the shafts (4) to the beam section (1).

2. A sulky according to claim 1, characterized in that said elastic connection is a biasing resilient element.

3. A sulky according to claim 2, wherein said biasing resilient element is contained in a rigid casing extending from said beam section to said shafts.

4. A sulky according to claim 3 wherein said biasing resilient element is selected from the group consisting of;
   (i) a spring;
   (ii) an elastomeric band and;
   (iii) a hydraulic system.

5. A sulky having two shafts, and a frame having a seat section and having lateral arms extending from said frame downwardly and supporting a wheel mounted on a lower portion of said lateral arms by means of a wheel mounting further comprising;
   a rear arm member extending downwardly from each shaft at an angle thereto and pivotally attached proximate a lower end thereof at a point on the respective lateral arm said point being below said wheel mounting; and
   an extensible resilient member extending between said frame and each of said shafts respectively.

6. A sulky, according to claim 5, wherein said point where said rear arm member is pivotally attached proximate a lower end thereof to a point on the respective lateral arm is approximately 120 mm below said wheel mounting.

7. A sulky, according to claim 5, further comprising a means mounted between said rear arm member or said shaft and said frame for establishing a minimum distance therebetween and said extensible resilient member permits movement therebetween from said minimum distance to longer distances.

8. A sulky, according to claim 7, wherein said means is a casing and said extensible resilience member is contained in said casing.

9. A sulky having two shafts, and a frame having a seat section and having a lateral arm corresponding to each shaft extending from said frame downwardly and supporting a wheel mounted on a lower portion of said lateral arms by means of a wheel mounting further comprising;
   a rear arm member extending downwardly from each shaft at an angle thereto and pivotally attached proximate a lower end thereof at a point on the respective lateral arm; and
   an assembly comprising an extensible resilient member and a limiting means extending substantially horizontally coaxially from each of said shafts to said corresponding lateral arm to define a triangle formed by said assembly, rear arm and lateral arm said limiting means establishing a minimum distance upon pivoting of said rear arm member toward said lateral arm.

* * * * *